Aug. 18, 1942.  W. STIEBER  2,293,085
DISENGAGING FRICTION COUPLING
Filed June 28, 1939
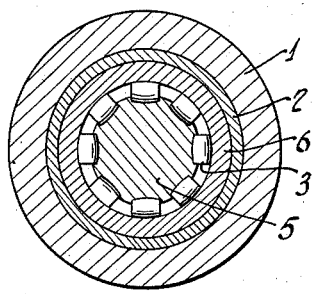
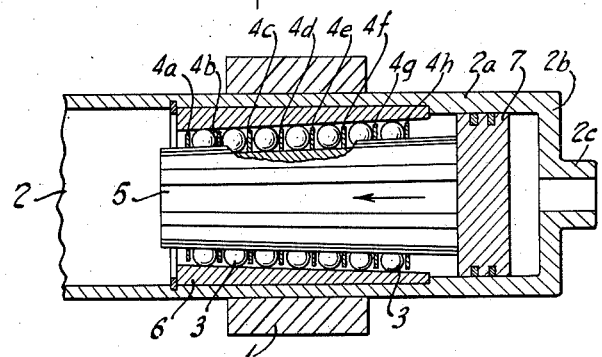
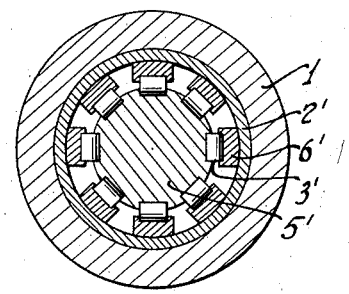
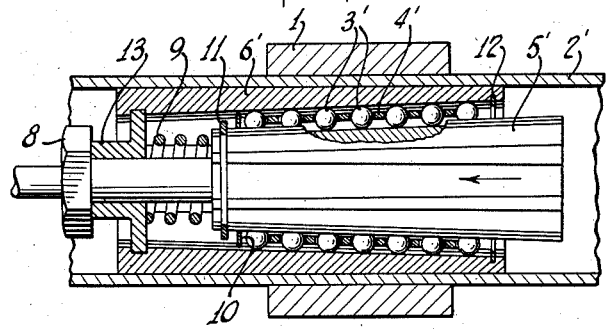
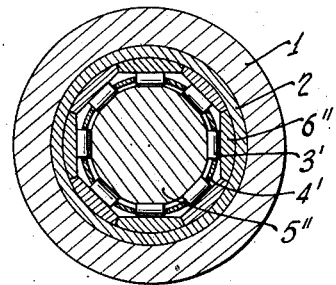
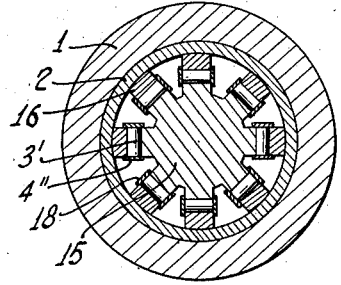
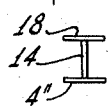
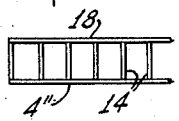
INVENTOR
WILHELM STIEBER
BY Karl A. Mayr
ATTORNEY Patented Aug. 18, 1942

2,293,085

UNITED STATES PATENT OFFICE 2,293,085

DISENGAGING FRICTION COUPLING

Wilhelm Stieber, Munich, Germany

Application June 28, 1939, Serial No. 281,622
In Germany July 1, 1938

13 Claims. (Cl. 287—52.01)

The present invention refers to a disengageable frictional engaging device for coupling together two bodies provided with sliding surfaces which rest on one another; said device comprising a cone member disposed directly adjacent to one of the bodies to be coupled, a plurality of rolling bodies running on said cone member, and a suitable counter-cone member arranged in such a manner that, by axial displacement of the counter-cone, the rolling bodies are pressed against the first mentioned cone member whereby the latter and the one body co-ordinated to it are pressed together and the latter body is forced in essentially radial direction against the other body to be coupled. Said first mentioned cone member and the one of said bodies adjacent to it are elastically and not permanently deformed during the coupling operation so that uncoupling can be effected by moving said counter-cone in opposite direction.

The present invention is closely related to the invention disclosed in copending application Serial No. 84,502, now Patent No. 2,206,373. According to the present invention one or both cone surfaces contacting the rolling bodies are of polygonal cross-sectional configuration and the axes of the rollers are arranged substantially at right angles to the direction of the relative movement of said cone members. With the arrangement according to the present invention the cone members may be displaced with respect to one another without relative rotational movement. For the rolling bodies balls, cylindrical rollers as well as barrel-shaped rollers may be used. The arching of the barrel-shaped rollers may be made in such a way that it approaches the curvature of the hollow cone to any desired degree. If in this case the solid or center cone is provided with concave races on which the barrel-shaped rollers run closely, a very high loading capacity is achieved thereby.

One of the two cones or both, preferably the cone transmitting the compressive forces to the part to be coupled, may be divided into individual elements (segments, sectors or the like), each of said elements being provided with only one bearing surface for a series of said rolling bodies.

The division of the cone members has the advantage that the manufacture of the contact surfaces of the individual elements is made much easier, particularly in cases where the curvature of the roller surface differs from the curvature of the surface of the cone.

Guiding of the rolling bodies may be effected either by rings or by cages. If the hollow or outer cone is divided into individual elements, preferably these individual elements are also guided. The devices required for this purpose may be combined with the devices for guiding the rolling bodies.

Further and other objects of the present invention will be hereinafter set forth in the accompanying specification and claims and shown in the drawing which, by way of illustration, show what I now consider to be preferred embodiments of my invention.

In the drawing:

Figure 1 is a cross sectional view of a device according to the present invention;

Figure 2 is a longitudinal sectional view of the device shown in Figure 1;

Figure 3 is a cross sectional view of a modified device according to the present invention;

Figure 4 is a longitudinal sectional view of the device shown in Figure 3;

Figure 5 is a cross sectional view of another modification of the device according to the present invention;

Figure 6 is a cross sectional view of a further modification of the device according to the present invention;

Figure 7 is an end view of a roller race used in the modification of the device according to the present invention shown in Figure 6;

Figure 8 is a top view of the race shown in Figure 7.

Like parts are designated by like numerals in all figures of the drawing.

Referring more particularly to Figures 1 and 2 of the drawing a body 1 is to be fastened to a hollow shaft 2. A hollow cone 6 is fitted in the hollow shaft. Barrel-shaped rollers 3 and a solid cone 5 are provided within hollow cone 6. The arching of the barrel-shaped rollers 3 is made similar to the interior curvature of hollow cone 6. The solid or center cone 5 is provided with concave surfaces conforming with the axial curvature of the rollers 3 running thereon. As shown in the drawing, the running surfaces of member 5 may be embedded so deeply in the said member that guiding shoulders for the rollers 3 are formed. To guide the rollers annular members 4a to 4h are provided in the embodiment of the invention according to Figure 2. The hollow shaft 2 comprises a cylindrical part 2a containing a piston 7 which is operatively connected with the central member 5. The hollow shaft 2 is closed by a bottom part 2b having an aperture 2c.

If on the center cone 5 a force is brought to bear in direction of the arrow, by feeding compressed air or pressure fluid through bore 2c and thus causing it to act on piston 7, cone 5 is displaced in a manner corresponding to the strength of this force, and creates a compressive stress which is brought to bear through the agency of the rolling bodies 3 and the hollow cone 6 on the hollow shaft 2 and causes an expansion of this hollow shaft in the neighborhood of the rollers 3. Due to this expansion hollow shaft 2 is pressed against body I and thus coupled to the latter by friction pressure. Disengagement of the coupling may be effected by suitable choice of the conicity of members 5 and 6 whereby the force acting in the direction of the arrow may be compensated. Owing to the elasticity of hollow shaft 2 and the small friction of the rolling bodies the center cone 5 moves without application of an exterior force opposite the direction of the arrow and thereby effects the disengagement of the coupling of parts I and 2. If the inclination of the cones is made so small that the disengagement is not effected without the application of an exterior force, a force acting opposite to the direction of the arrow may be provided in conventional manner to secure disengagement. The force for producing the coupling action may be provided by other conventional means.

In the embodiment of the invention according to Figures 3 and 4 a body I is also to be fastened to a hollow shaft 2'. Hollow shaft 2' is provided with a substantially cylindrical bore. The outer cone member is divided into a plurality of segments 6'. The number of segments corresponds to the number of rows of rollers 3'. The latter are embedded so deeply in recesses provided in the segments 6' that guiding shoulders are formed for the rollers. The center cone member 5' possesses grooves corresponding to the recesses in the segments 6' so that, in circumferential direction, the relative position of the segments 6', the rollers 3' and the center cone 5' is secured. The rollers 3' may be made cylindrical as shown. In this case the rolling surfaces in the segments 6' and in the center cone 5' are plane. A cage 4' secures the desired position and spacing of the rollers. The segments 6', seen from the side (Fig. 4), are wedge-shaped and are provided with a groove at each end. A flanged member 13 engages one of said grooves. The groove at the opposite end holds a closing disc 12 which prevents dropping out of the rollers and the cage. An annular member 10 and a retaining ring 11 secure the relative position of center cone 5' and of rollers 3'. Solid cone 5' is provided with a screw adjustment comprising a nut 8 bearing against flange member 13. When nut 8 is tightened, the cone 5' is displaced axially in the direction of the arrow, and the friction-coupling is engaged. Disengagement of the coupling is aided by a spring 9 which assures relative position of all parts, also when the coupling is in disengaging condition. The entire straining set 3', 4', 5', 6', 8, 9, 10, 11, 12, 13 may be displaced axially in the hollow shaft 2', so that the straining and coupling action may be produced at any desired point. By dividing the hollow cone into individual elements 6', the axial displacement is facilitated, because, after disengagement of the friction coupling, the individual elements are separated from the hollow shaft 2'.

Instead of the screw arrangement any other means known in itself may be used for tightening the coupling.

In the embodiment of the invention according to Figure 5 the hollow cone is divided into a plurality of parts 6" lying side by side whereby the number of said parts corresponds to the number of the plane roller races; the rollers 3' are guided by means of a cage 4'. Plane surfaces for the rollers 3' are provided on the central cone member 5". In the embodiment of the invention according to Fig. 6 the parts 16 carrying the races are approximately as broad as the rollers are long. The center member 15 is provided with recesses forming projecting longitudinal strips of substantially the same breadth as the parts 16.

The rollers 3' are guided by means of a cage 4" shown in larger scale in Figures 7 and 8. The side portions 18 are broader than the diameters of the rollers, so that they overlap both, the parts 16 and the projecting race-surfaces of cone member 15. Thus, by means of this cage, not only the rollers are guided, but also the position of parts 16 is fixed with respect to the projecting surfaces of cone member 15.

In the embodiments of the present invention shown the engaging or coupling pressure is applied from within. It is no departure from the present invention to provide friction couplings in which the engaging pressure acts radially towards the center of the device. In the constructions according to Figures 3 to 6 the number of the individual elements 6', 6", or 16 as well as their distance from one another may be chosen at will according to requirements.

If, instead of cylindrical rollers, rolling bodies of a different shape are used, the contact surfaces of the parts 6', 6", and 16 and of the center cone 5', 5" and 15 must be designed accordingly. With all embodiments of the invention the conicity of cone and counter-cone members may be different. In this case, the rollers of one set and lying axially side by side are of gradually increasing diameters.

In particular cases the conicity of one of the two cone members may be zero, that is to say, the cone has a cylindrical surface.

While I believe the above described embodiments of my invention to be preferred embodiments, I wish it to be understood that I do not desire to be limited to the exact details of design and construction shown and described, for obvious modifications will occur to a person skilled in the art.

What I claim is:

1. A disengageable frictional engaging device comprising two longitudinal operating members slightly tapered in axial direction and disposed substantially within one another and being axially movable with respect to one another and having corresponding operating surfaces facing one another and approaching and separating from one another upon relative axial movement of said members towards and from one another, one of said members being of substantially polygonal cross sectional configuration and having individual longitudinal operating surfaces, and a plurality of roller means disposed between said members and along said longitudinal surfaces and rotating about axes substantially at right angles to the direction of movement of said members.

2. A disengageable frictional engaging device comprising two longitudinal operating members disposed substantially within one another and being axially movable with respect to one another and having corresponding surfaces facing one another and being slightly tapered in axial direction and approaching and separating from one another upon relative axial movement of said members towards and from one another, a plurality of roller means disposed between said surfaces and rotating about axes substantially at right angles to the direction of movement of said surfaces upon relative movement of said members, longitudinal recesses provided in one of said members and forming longitudinal strips in the surface of said member, and race elements for said roller means having side portions broader than the diameter of said roller means and extending into said recesses and preventing revolving of said members with respect to one another.

3. A disengageable frictional engaging device comprising two longitudinal operating members disposed substantially within one another and being axially movable with respect to one another and having corresponding surfaces facing one another and being tapered in axial direction and approaching and separating from one another upon relative axial movement of said members, a plurality of roller means disposed between said surfaces and rotating about axes substantially at right angles to the direction of movement of said surfaces upon relative movement of said members, a chamber means rigidly connected with one of said operating members, and a piston means connected with the other of said operating members and being disposed in said chamber means for moving one of said operating members by gaseous or liquid medium pressure acting in said chamber.

4. A disengageable frictional engaging device comprising a longitudinal central operating member of tapered axial sectional configuration and having a plurality of longitudinal recesses on the outside thereof leaving longitudinal projecting operating surfaces therebetween, a plurality of substantially wedge shaped longitudinal outer operating members disposed equidistantly around and axially movable with respect to said central member and having longitudinal operating surfaces of substantially the same width as and being individually positioned opposite said first mentioned surfaces and approaching and separating from said first mentioned surfaces upon relative axial movement of said central member and said outer members, a plurality of roller means disposed in between said surfaces and rotating about axes substantially at right angles to the direction of movement of said members, and race elements for said roller means, said elements having side portions broader than the diameter of said roller means and extending into said recesses and laterally engaging said outer members and preventing rotation of said outer members and said central member with respect to one another.

5. A disengageable frictional engaging device comprising a central, substantially cone shaped, longitudinal operating member having a plurality of longitudinal, individual operating surfaces, another operating member disposed around said first member and being axially movable with respect thereto and having an operating surface corresponding substantially to and facing the operating surfaces of said first member, said members approaching and separating from one another upon relative axial movement thereof, and a plurality of roller means disposed along the operating surfaces of said first member and between the operating surfaces of both said members and rotating about axes substantially at right angles to the direction of movement of said surfaces upon relative movement of said members.

6. A disengageable frictional engaging device comprising two longitudinal operating members slightly tapered in axial direction and disposed substantially within one another and being axially movable with respect to one another and individually having a plurality of corresponding individual longitudinal operating surfaces, the individual surfaces of one member individually facing the corresponding surfaces of the other member, the surfaces of one member approaching and separating from the corresponding surfaces of the other member upon relative axial movement of said members towards and from one another, and a plurality of roller means disposed between said members and along said longitudinal surfaces and rotating about axes substantially at right angles to the direction of movement of said members.

7. A disengageable frictional engaging device comprising two longitudinal slightly tapered operating members disposed substantially within one another and being axially movable with respect to one another and individually having a plurality of corresponding individual longitudinal operating surfaces, the individual surfaces of one member individually facing the corresponding surfaces of the other member, the surfaces of one member approaching and separating from the corresponding surfaces of the other member upon relative axial movement of said members towards and from one another, one of said members being longitudinally and radially split into a plurality of individual sections, and a plurality of roller means disposed between said members and along said longitudinal surfaces and rotating about axes substantially at right angles to the direction of movement of said members.

8. A disengageable frictional engaging device comprising two longitudinal slightly tapered operating members disposed substantially within one another and being axially movable with respect to one another and individually having a plurality of corresponding individual longitudinal operating surfaces, the individual surfaces of one member individually facing the corresponding surfaces of the other member, the surfaces of one member approaching and separating from the corresponding surfaces of the other member upon relative axial movement of said members towards and from one another, one of said members being longitudinally and radially split into a plurality of individual sections, each of said sections including one longitudinal operating surface, and a plurality of roller means disposed between said members and in individual rows along said longitudinal surfaces and rotating about axes substantially at right angles to the direction of movement of said members.

9. A disengageable frictional engaging device comprising two longitudinal slightly tapered operating members and disposed substantially within one another and being axially movable with respect to one another and individually having a plurality of corresponding individual longitudinal operating surfaces, the individual surfaces of one member individually facing the corresponding surfaces of the other member, the surfaces of one member approaching and separating from the corresponding surfaces of the other member upon relative axial movement of said members towards and from one another, a plurality of roller means disposed between said members and along said longitudinal surfaces and rotating about axes substantially at right angles to the direction of movement of said members, and race means for said roller means connected with said members and maintaining definite relative position of said members and roller means.

10. A disengageable frictional engaging device comprising two longitudinal slightly tapered operating members and disposed substantially within one another and being axially movable with respect to one another and individually having a plurality of corresponding individual longitudinal operating surfaces, the individual surfaces of one member individually facing the corresponding surfaces of the other member, the surfaces of one member approaching and separating from the corresponding surfaces of the other member upon relative axial movement of said members towards and from one another, and a plurality of roller means disposed between said members and along said longitudinal surfaces and rotating about axes substantially at right angles to the direction of movement of said members, one of said members having longitudinal channels individually having bottoms individualy forming the longitudinal operating surfaces of said member and shoulders laterally maintaining the position of said roller means.

11. A disengageable frictional engaging device comprising a longitudinal central member slightly tapered in axial direction and having a substantially polygonal cross sectional configuration and a plurality of longitudinal operating surfaces, a plurality of longitudinal wedge shaped members disposed around said central member and having longitudinal operating surfaces individually facing the operating surfaces of said central member and approaching and separating from the surfaces of said central member upon relative axial movement of said central member and said wedge shaped members, and a plurality of roller means disposed in rows between the surfaces of said central member and the operating surfaces of said wedge shaped members and rotating about axes substantially at right angles to the direction of movement of said members.

12. A disengageable frictional engaging device comprising a longitudinal central member slightly tapered in axial direction and having a substantially polygonal cross sectional configuration and a plurality of longitudinal grooves having longitudinal operating surfaces at the bottom thereof, a plurality of longitudinal wedge shaped members disposed around said central member and having longitudinal operating surfaces individually facing the operating surfaces of said central member and approaching and separating from the surfaces of said central member upon relative axial movement of said central member and said wedge shaped members, and a plurality of roller means disposed in said grooves in rows between the surfaces of said central member and the operating surfaces of said wedge shaped members and rotating about axes substantially at right angles to the direction of movement of said members.

13. A disengageable frictional engaging device comprising a longitudinal central member slightly tapered in axial direction and having a substantially polygonal cross sectional configuration and a plurality of longitudinal grooves having longitudinal operating surfaces at the bottom thereof, a plurality of longitudinal wedge shaped members disposed around said central member and having longitudinal grooves having longitudinal operating surfaces at the bottom thereof and individually facing the operating surfaces of said central member and approaching and separating from the surfaces of said central member upon relative axial movement of said central member and said wedge shaped members, and a plurality of roller means disposed in said grooves in rows between the operating surfaces of said central member and the operating surfaces of said wedge shaped members and rotating about axes substantially at right angles to the direction of movement of said members.

WILHELM STIEBER.